United States Patent Office 2,945,027
Patented July 12, 1960

2,945,027
PROCESS FOR THE PREPARATION OF PSEUDOSAPOGENINS

George Francis Harold Green, London, John Christopher Hamlet, Ulverston, and Alan Gibson Long, Greenford, England, assignors to G.N.R.D. Patent Holdings Limited, London, England, a British company No Drawing. Filed Dec. 3, 1956, Ser. No. 625,621

2 Claims. (Cl. 260—239.55)

This invention is concerned with improvements in or relating to the preparation, from steroid isosapogenins, of pseudoisosapogenins, that is steroid compounds whose D-ring and the side chain attached thereto may be represented by the following general formula

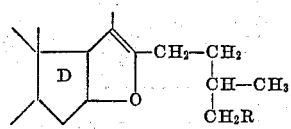

where R is a hydroxyl or acyloxy group. When in the following specification and claims the term isosapogenin is employed it is to be clearly understood to refer not only to isosapogenins having a free hydroxyl group in the 3-position, but also to esters thereof.

Isosapogenins are distinguished from normal sapogenins by a difference in configuration of the spiral ketal side chain which may involve both positions 22 and 25. The exact nature of these differences is, as yet, uncertain and the side chain of an isosapogenin is usually written as

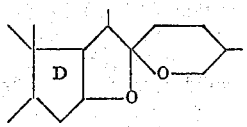

whilst that of normal sapogenins is written as

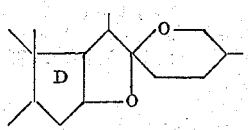

Sapogenins having the iso configuration include a number of readily available naturally occurring materials which are valuable as starting materials in the synthesis of important steroid compounds; thus for example hecogenin is a valuable starting material for the synthesis of cortisone and related compounds.

An essential step in the utilisation of steroid isosapogenins for the preparation of many hormones, such as cortisone and the sex-hormones, is the removal of their characteristic side-chain, consisting of 5- and 6-membered heterocyclic rings attached to ring D. It has previously been proposed that as the first stage of this degradation, sapogenins particularly isosapogenins should be converted into pseudosapogenins by heating the sapogenin with an acid anhydride, such as acetic anhydride, either in an autoclave or, if desired, under reflux, in the presence of a catalyst, to give the pseudosapogenin by opening of the 6-membered heterocyclic ring. It has also been proposed that as subsequent stages of the degradation, the pseudo-sapogenin should be oxidised, for example with chromium trioxide, to give a substituted 20-oxo-steroid containing the following side-chain

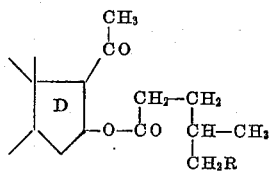

which latter compound may then be treated with acid or alkali to give a $\Delta^{16}$-20-keto-steroid which is known to be useful in the synthesis of various hormones. The present invention is, however, concerned with the first of these degradation stages, namely, the conversion of steroid isosapogenins to pseudoisosapogenins, in good yield.

We have now found that this conversion can be conveniently and efficiently carried out by using carboxylic acids in place of the acid anhydrides used and proposed hitherto, see, for example, Gould et al., U.S. Patent No. 2,632,008. The use of acids in place of anhydrides is attended by a number of advantages, among which may be mentioned the fact that, in general, considerably improved yields are obtained while acids are, in general, more readily obtainable and considerably cheaper than their anhydrides. Acids are also easier to remove and recover on completion of the reaction, being readily extracted with alkali and furthermore they show less tendency to decompose under the reaction conditions used. Many carboxylic acids are suitable for the purpose of the present invention provided that such acids do not affect the steroid compounds undesirably in another portion of the molecule under the reaction conditions employed; in general strong organic acids are not suitable and thus, for example, we prefer that the acid employed should not contain a nitro, halogeno or sulphonic acid group. We have found that carboxylic acids containing from 2 to 20 carbon atoms are suitable.

The value of carboxylic acids in obtaining high yields of pseudosapogenins from sapogenins is surprisingly limited to the isosapogenins. Thus whilst yields of 80% and more of pseudoisosapogenins can be obtained from isosapogenins by the process of the invention the yield of pseudosapogenin from sarsasapogenin, a normal sapogenin, is only 27% using caprylic acid whilst Marker et al. (J.A.C.S., 1940, 62, 518) were unable to recover any pseudosarsasapogenin after heating the sarsasapogenin with acetic acid at 210° C. for 7 hours.

According to the present invention, therefore, we provide a process for the preparation of pseudoisosapogenins and their esters which comprises the step of heating a steroid isosapogenin or esters thereof in a liquid medium consisting essentially of one or more carboxylic acids containing from 2–20 carbon atoms.

We prefer that the acid should be a saturated aliphatic mono-carboxylic acid containing from 6 to 12 carbon atoms.

The process according to the invention may, in general, be applied to all steroid isosapogenins. Where hydroxyl or esterified hydroxyl groups, for example a 3-hydroxyl or esterified hydroxyl group, are present in the molecule, esterification or ester exchange may take place during the reaction. However ester groups thus formed may, if desired, be readily saponified during the isolation of the free pseudoisosapogenin. Alternatively any such ester groups may be left in the molecule and for example the saponification carried out at the time of formation of a 20-keto steroid from a substituted 20-oxo-steroid of Formula IV above obtained from a pseudoisosapogenin prepared by the process according to the invention. When the process according to the invention is to be used in the synthesis of cortisone and related substances, the steroid isosapogenin used as starting material may conveniently be one of the following or a lower alkyl ester thereof, 3β-hydroxy-5α:22a-spirostan-12-one (hecogenin), 3β-hydroxy-5α:22a-spirostane (tigogenin), 3β-hydroxy-5α:22a-spirostan-11-one (11-ketotigogenin), 3β-hydroxy-5α:22a-spirost-9-ene ($\Delta^{9(11)}$-dehydrotigogenin), 3β:11α-dihydroxy-5α:22a-spirostane (11α-hydroxytigogenin) or 3β-hydroxy-22a-spirost-5-ene (diosgenin).

The proportion of carboxylic acid to isosapogenin in the process of the invention is not critical provided that sufficient acid is present to bring about the desired reaction. The reaction is however preferably carried out in solution in the acid and thus sufficient acid should in general be used to dissolve the isosapogenin starting material. An excess of acid over that required to dissolve the isosapogenin is not in general required, such excess only resulting in unnecessary increase of the reaction volume.

The lowest temperature at which it is convenient to carry out the process according to the invention is about 150° C., since below this the time for reaction becomes very extended. The upper limit of temperature is fixed only by the stability of the acid, the steroid isosapogenin and the pseudoisosapogenin. It will be appreciated therefore that the optimum temperature will vary with each particular acid and isosapogenin employed and should be determined by a preliminary test in each case. We find that, in general, temperatures within the range of 160–350° C. are suitable. Where the boiling point of the acid is greater than 160° C. and lower than 350° C., it is convenient to carry out the reaction under reflux; in the case of lower boiling acids it is of course necessary to use a closed vessel, such as an autoclave. The reaction is preferably carried out at a temperature within the range of 220–250° C.

The time required for the completion of the reaction also varies with the nature of steroid isosapogenin, the acid used and the temperature at which the reaction is carried out and must be determined by experiment. The course of the reaction may be followed polarimetrically, since the conversion of the steroid isosapogenin to the pseudoisosapogenin results in an increase in the specific rotation and the reaction may be considered to be complete when the maximum value of the specific rotation is attained. Thus, for example, we have found that in the case of 11-ketotigogenin when the reaction is carried out under reflux using caproic acid, B.P. 205° C., the optimal time is 5–6 hours, for caprylic acid, B.P. 240° C., 2 hours and for capric acid, B.P. 270° C., 1 hour.

We find it preferable to remove the water produced during the process according to the invention as soon as it is formed; this is most conveniently effected by having present in the reaction mixture an amount of an acid anhydride, stoichiometrically equivalent to the amount of water produced during the reaction and hence stoichiometrically equivalent to the amount of isosapogenin used; the acid anhydride may correspond to the acid used or may be derived from a different acid. Thus in the latter case we may, for example, use a mixture of a saturated aliphatic monocarboxylic acid containing from 6–12 carbon atoms, such as caprylic acid, and an amount of acetic anhydride equivalent to the amount of water produced during the reaction i.e. substantially stoichiometrically equivalent to the amount of isosapogenin used. Any such acid anhydride should, in general, not be derived from a strong organic acid and as with the acids employed according to the process of the invention, we prefer that the anhydride should not be derived from an acid containing a nitro, halogeno or sulphonic acid group.

The use of a reaction medium in the process according to the invention consisting essentially of an acid but also containing a small proportion of an anhydride is of course distinguished from the process of Patent No. 2,632,008 which uses a media consisting essentially of an acid anhydride and containing catalytic quantities of acid. The process of this invention in general gives superior results compared with the process of Patent No. 2,632,008.

On completion of the reaction of this invention the acid may be readily separated from the pseudoisosapogenin by alkaline extraction, as described in the following examples. Where it is desired to obtain the pseudoisosapogenin in ester form, these may be isolated from the reaction product from which the acid has been removed by the said alkaline extraction. Alternatively where the pseudoisosapogenin is required in an unesterified form, the said reaction product is preferably submitted to alkaline hydrolysis, for example with alcoholic or aqueous alcoholic caustic alkali, such as methanolic caustic potash, and the pseudoisosapogenin isolated from the hydrolysate. In general we prefer to proceed via such an alkaline hydrolysis as the purification of the reaction product is thereby facilitated, the isolated and purified free pseudoisosapogenin being reesterified by any suitable method, where pseudoisosapogenin esters are required.

In order that the invention may be well understood, the following examples are given by way of illustration only:

EXAMPLE 1

*3β:26-dihydroxy-11-keto-5α-furost-20(22)-ene*

11-ketotigogenin acetate (5 g.) was refluxed under nitrogen in n-caproic acid (10 ml.) for 6 hours. After this time the rotation, observed by withdrawing a 1 ml. aliquot and diluting to 10 ml. with chloroform, had reached a maximum value (α observed +1.55).

The reaction solution was cooled, ether (200 ml.) added and the organic solution washed with three portions of 0.5 N sodium hydroxide (total 600 ml.), once with water, dried (MgSO$_4$) and the solvent removed in vacuo, affording a pale yellow oil.

The oil was refluxed for thirty minutes with a solution of potassium hydroxide (2.5 g.) in methanol (50 ml.) and then hot water (about 400 cc.) added slowly, the whole was then allowed to cool to room temperature. The precipitated solid was collected by filtration and washed with several portions of hot water made slightly alkaline with potassium hydroxide, a final washing was made with distilled water. The solid was dried in vacuo over sodium hydroxide pellets, and when dry was washed with ether (about 30 cc.), after a further drying 3β:26-dihydroxy-11-keto-5α-furost-20(22)-ene was obtained as a white powder (3.70 g.; 81%), M.P. 183–190° [α]$_D$+74° (c.=2 in CHCl$_3$).

Further crystallisation from acetone yielded needles, M.P. 194–196° C. which from analysis appears to be a solvate. (Found: C, 74.1; H, 10.0. C$_{27}$H$_{42}$O$_4$.C$_3$H$_6$O requires C, 73.7; H, 9.9%.) Recrystallisation from methanol afforded prisms, M.P. 194–196° C., $$[\alpha]_D^{20}+76°$$

(c. 2.0 in chloroform), $$\lambda_{max}^{EtOH}\ 217\ m\mu$$

(e 5,300). (Found: C, 75.0; H, 9.7. C$_{27}$H$_{42}$O$_4$ requires C, 75.3; H, 9.8%.)

EXAMPLE 2

*Reaction using acetic acid*

11-ketotigogenin acetate (3 g.) suspended in glacial acetic acid (6 ml.) was heated in a glass Carius tube to 270° at a rate of 145°/hour. Immediately the temperature reached 270° the glass tube was cooled rapidly to room temperature. Solvent was removed in vacuo and the resulting oil refluxed for thirty minutes with potassium hydroxide (1.5 g.) in methanol (30 ml.). The reaction solution was allowed to cool and then refrigerated for several hours. The crystalline solid was collected, washed with a little cold methanol and dried in vacuo affording 3β:26-dihydroxy-11-keto-5α-furost-20(22)-ene as needles (0.96 g.; 35%), M.P. 186–190°, [α]$_D$+77° (c. 1.0 in chloroform).

11-ketotigogenin acetate (5 g.), glacial acetic acid (8.5 ml.) and acetic anhydride (1.5 ml.) treated in an exactly similar manner to the above experiment gave the furostene diol (1.95 g. 43%), M.P. 186–191°, [α]$_D$+73° (c. 1.0 in chloroform).

washed with aqueous sodium hydroxide (8%; 2×350 ml.). The aqueous extract was extracted with benzene, the benzene extracts combined, washed with water (250 ml.) and distilled to dryness. The residue was heated under reflux with methanolic potassium hydroxide (5%; 500 ml.) for 45 minutes. Hot water (400 ml.) was added, the precipitated solid filtered off, washed with water (3000 ml.) and dried at 40° in vacuum for 16 hours yielding 3β:26-dihydroxy-11-keto-5α-furost - 20(22)-ene (45.8 g.; 91.6%), M.P. 183–188°, [α]$_D$+68.2° (c. 1.0 in chloroform).

EXAMPLE 3

| Weight of 11-ketotigogenin acetate | Acid used | Volume or Weight of acid | Volume of corresponding anhydride, ml. | Time of reaction, hr. | Boiling point of acid, degrees | Δα, degrees | Weight of product, g. | Percent Yield | M.P., degrees | [α]$_D$ c,2 in CHCl$_3$, degrees |
|---|---|---|---|---|---|---|---|---|---|---|
| 5 g | n-butyric | 8.3 ml | 1.7 | 24 | 164 |  | 3.65 | 80 | 181–186 | +72 |
| 5 g | n-caproic | 10 ml |  | 6 | 205 | +3.10 | 3.70 | 81 | 183–190 | +74 |
| 3 g | iso-caproic | 24 ml |  | 6 | 208 | +0.98 | 2.15 | 79 | 186–191 | +73 |
| 5 g | n-caprylic | 16 ml |  | 2 | 238 | +2.78 | 4.15 | 91 | 179–183 | +71 |
| 5 g | n-caprylic | 6.8 ml | 3.2 | 2 | 238 | +3.50 | 3.66 | 80 | 176–181 | +74 |
| 5 g | n-capric | 15 g |  | ½ | 269 |  | 3.55 | 78 | 170–177 | +75 |
| 5 g | myristic | 10 g |  | ½ | [1] 295–310 |  | 3.02 | 66 | 181–186 | +74 |
| 5 g | oleic | 10 ml |  | 1 | [1] 270–280 |  | 3.07 | 66 | 184–188 | +69 |

[1] Actual temperature of reaction; the water formed in the reaction depressed the B.P. of the acid.

The experiments shown in the above table were all carried out by the procedure described in Example 1.

EXAMPLE 4

*3β:26-dihydroxy-5α - spirost-20(22)en (pseudotigogenin)*

3β-acetoxy-5α:22a-spirostan (10.0 g.) in n-caprylic acid (13.2 ml.) containing n-caprylic anhydride (6.8 ml.) was heated at the reflux temperature under N$_2$ for 1 hour. After cooling, the product was taken up in ether (200 ml.) washed with 2 N sodium hydroxide solution (4×50 ml.) and then with water (4×100 ml.) dried over MgSO$_4$ and evaporated under reduced pressure. The residue (12.35 g.) in methanol (250 ml.) was hydrolysed by refluxing with 10% aqueous sodium hydroxide solution (32 ml.) for 30 minutes. Half the methanol was then removed under reduced pressure and the diol precipitated with water (500 ml.) and filtered after allowing to cool. The precipitate was washed with hot dilute sodium hydroxide solution and then with hot water (8.93 g.), M.P. 165–178°. Crystallisation from nonacidic methanol yielded pure 3β:26-dihydroxy-5α:spirost-20(22)en, M.P. 179–189° C., [α]$_D^{20}$+24(c. 0.47 CHCl$_3$)

$\lambda_{max.}^{EtOH}$ 218 mμ. $E_{1\ cm.}^{1\%}$ 114

(Found: C, 77.93; H, 10.51. Calc. for C$_{27}$H$_{44}$O$_3$: C, 77.88, H, 10.58%.)

EXAMPLE 5

*3β:26-dihydroxy-12-keto-5α-spirost-20(22)-en*

12-ketotigogenin acetate ("hecogenin acetate"; 10 g.) was refluxed in n-caprylic acid (13.2 ml.) and n-caprylic anhydride (6.8 ml.) under nitrogen for 2 hours. Thereafter the directions given in Example 1 were followed, so that after saponification 3β:26-dihydroxy-12-keto-5α-spirost-20(22)-en separated as a white solid (8.3 g.; 92%), M.P. 189–190°, [α]$_D^{20}$+100° (c.=1.8 in CHCl$_3$). Crystallisation from aqueous acetone afforded a pure specimen as plates, M.P. 190–191°, [α]$_D$+103° (c.=1.5% in CHCl$_3$).

EXAMPLE 6

*3β:26-dihydroxy-11-keto-5α-furost-20(22)-ene*

A mixture of 11-ketotigogenin (50 g.), acetic anhydride (25 ml.) and n-caprylic acid (95 ml.) was heated under reflux using a Dean and Stark tube containing n-caprylic acid. The temperature of the reaction mixture rose slowly to 220°, after which time the heating was continued for a further 2 hours. The reaction mixture was then cooled, poured into benzene (350 ml.) and the solution

EXAMPLE 7

*3β:26-dihydroxy-5β:25D-furost-20(22)-ene*

Smilagenin (1.7 g.), n-caprylic anhydride (2.46 ml.) and n-caprylic acid (5 ml.) were refluxed under nitrogen for 1¾ hours, after which time the [α]$_D^{20}$ of the solution remained constant at +5°. After cooling, the reaction mixture was extracted with ether and the ethereal extract, after washing with aqueous sodium hydroxide and water, was evaporated to leave a gum which was saponified by refluxing in methanolic potassium hydroxide solution (5%; 20 ml.) in an atmosphere of nitrogen for 30 minutes. The addition of hot water precipitated a solid which was filtered, washed with slightly alkaline hot aqueous methanol, and dried to give 3β:26-dihydroxy-5β:25D-furost-20(22)-ene (pseudo smilagenin), M.P. 158–161°, [α]$_D^{22}$+24° (c. 0.98 in chloroform).

EXAMPLE 8

*3β:26-dihydroxy-furosta-5:20(22)-diene*

Diosgenin (4 g.) was dissolved in a mixture of n-caprylic acid (27 ml.) and n-caprylic anhydride (10 ml.) and the mixture heated under reflux for 1¾ hours. After cooling the solution was extracted with ether, the ethereal extract washed with 2 N sodium hydroxide solution and water, followed by a water wash and evaporated to dryness. The residual gum was saponified by heating in methanolic potassium hydroxide (6%; 50 cc.) under reflux for 30 minutes. Hot water was then added, the precipitate removed by filtration, washed with slightly alkaline hot water, reprecipitated from slightly alkaline methanol and finally recrystallized from aqueous methanol to give 3β:26-dihydroxy-furosta-5:20(22)-diene (pseudodiosgenin) (3.47 g.; 87%), M.P. 157–163°, remelting at 174–177° (Kofler), [α]$_D^{18}$—36° (c. 1.7 in chloroform).

This application is a continuation-in-part of application Serial No. 482,406, filed January 17, 1955, now abandoned.

We claim:

1. A process for the conversion of a compound selected from the group consisting of hecogenin, tigogenin, 11-ketotigogenin, Δ$^{9(11)}$-dehydrotigogenin, 11α-hydroxy-tigogenin, disogenin and lower alkyl carboxylic 3-esters thereof into its pseudo derivative, which process comprises heating said compound in a reaction medium consisting essentially of an alkyl carboxylic acid containing from 6–12 carbon atoms at a temperature of from 160–350° C.

2. The process defined in claim 1 in which said alkyl carboxylic acid containing from 6–12 carbon atoms is caprylic acid.

References Cited in the file of this patent

UNITED STATES PATENTS

| | | |
|---|---|---|
| 2,632,008 | Gould | Mar. 17, 1953 |
| 2,716,116 | Fontaine et al. | Aug. 23, 1955 |
| 2,885,411 | Mueller et al. | May 5, 1959 |

OTHER REFERENCES

Marker: J.A.C.S., September 1947, pages 2170, 2184, 2191, 2194, 2196.

Russel E. Marker et al.: J. Am. Chem. Soc., vol. 62, pages 518–525, March 1940.